(12) United States Patent
Mizoguchi

(10) Patent No.: US 9,930,422 B2
(45) Date of Patent: Mar. 27, 2018

(54) VIDEO TRANSMISSION SYSTEM, VIDEO ENCODING APPARATUS, AND VIDEO DECODING APPARATUS

(71) Applicant: FUJITSU LIMITED, Kawasaki-shi, Kanagawa (JP)

(72) Inventor: Michiko Mizoguchi, Fuchu (JP)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 14/619,468

(22) Filed: Feb. 11, 2015

(65) Prior Publication Data

US 2015/0264360 A1  Sep. 17, 2015

(30) Foreign Application Priority Data

Mar. 17, 2014 (JP) ................. 2014-053740

(51) Int. Cl.
*H04N 19/159* (2014.01)
*H04N 19/44* (2014.01)
*H04N 19/50* (2014.01)
*H04N 21/63* (2011.01)

(52) U.S. Cl.
CPC ........... *H04N 21/631* (2013.01); *H04N 19/50* (2014.11)

(58) Field of Classification Search
CPC ...... H04N 19/50; H04N 19/159; H04N 19/44; H04N 21/631
See application file for complete search history.

(56) References Cited

U.S. PATENT DOCUMENTS

| 6,392,705 | B1 * | 5/2002 | Chaddha | G06T 9/40 348/388.1 |
| 6,603,883 | B1 * | 8/2003 | Hamanaka | H04N 19/29 375/240.02 |
| 2005/0117641 | A1 * | 6/2005 | Xu | H04N 21/2662 375/240.08 |
| 2005/0265450 | A1 * | 12/2005 | Raveendran | H04N 19/51 375/240.15 |
| 2008/0170528 | A1 * | 7/2008 | Bosch | H04N 21/2221 370/312 |

FOREIGN PATENT DOCUMENTS

| JP | 10-108175 A | 4/1998 |
| JP | 2000-224230 A | 8/2000 |

* cited by examiner

*Primary Examiner* — Anand S Rao
*Assistant Examiner* — Tyler B Edwards
(74) *Attorney, Agent, or Firm* — Fujitsu Patent Center

(57) ABSTRACT

A video encoding apparatus includes: an encoder configured to encode video data by encoding key data that can be encoded without referring to other data in the video data, first dependent data that is encoded by referring to the key data, and second dependent data that is encoded by referring at least to the first dependent data; and a communication processor configured to transmit the encoded key data and the encoded first dependent data to a video decoding apparatus via a first communication path, and to transmit the encoded key data and the encoded second dependent data to the video decoding apparatus via a second communication path which is different from the first communication path.

8 Claims, 11 Drawing Sheets

PLAYBACK ORDER

PLAYBACK ORDER

VIDEO TRANSMISSION SYSTEM, VIDEO ENCODING APPARATUS, AND VIDEO DECODING APPARATUS

CROSS-REFERENCE TO RELATED APPLICATION

This application is based upon and claims the benefit of priority of the prior Japanese Patent Application No. 2014-053740, filed on Mar. 17, 2014, the entire contents of which are incorporated herein by reference.

FIELD

The embodiments discussed herein are related to a video transmission system for transmitting encoded video data and a video encoding apparatus and video decoding apparatus applicable for use in such a video transmission system.

BACKGROUND

Generally, the amount of data used to represent video data is large. Accordingly, when transmitting video data from an apparatus storing the video data to some other apparatus, the video data may be encoded and compressed in order to reduce the amount of data to be transmitted.

Further, in a recent system, high-definition video data such as full High Vision video may be transmitted. When transmitting such high-definition video data, if the video data is encoded and compressed, the amount of data to be transmitted is still large, requiring a wide transmission bandwidth to transmit the video data. To address this, there have been proposed techniques for transmitting encoded and compressed video data over a plurality of communication paths or a plurality of communication channels (for example, refer to Japanese Laid-open Patent Publication Nos. H10-108175 and 2000-224230).

For example, in the image encoding/transmitting system disclosed in Japanese Laid-open Patent Publication No. H10-108175, the transmitter divides input video into a number, N, of simplified moving images, encodes the simplified moving images, and transmits the resulting simplified moving image codes over a plurality of different transmission channels, respectively. On the other hand, at the receiver, the received simplified moving image codes are decoded independently of each other by using a plurality of decoders, and the original video is reconstructed by combining the decoded simplified moving images or by interpolating between them. The N simplified moving images are generated, for example, by allocating the original video frames to the N simplified moving images in sequence. Alternatively, the N simplified moving images are generated by dividing each one of the original video frames into blocks of N pixels and by extracting pixels at specific positions from the respective blocks.

In the real time communication method disclosed in Japanese Laid-open Patent Publication No. 2000-224230, a plurality of communication paths are set up between a transmitting terminal and a receiving terminal, and information data that differ in importance are transmitted over the respective communication paths. For example, an information packet containing an I frame, an information packet containing a B frame, and an information packet containing a P frame are transmitted from the transmitting terminal to the receiving terminal over one communication path. On the other hand, the information packet containing the I frame is also transmitted from the transmitting terminal to the receiving terminal over the other communication path.

SUMMARY

According to the technique disclosed in Japanese Laid-open Patent Publication No. H10-108175, if a communication failure occurs on one of the plurality of transmission channels, the receiver is no longer able to receive the information transmitted over the failed transmission channel, because the content of information transmitted is different for each transmission channel. On the other hand, according to the technique disclosed in Japanese Laid-open Patent Publication No. 2000-224230, the information transmitted over one communication path is the same as a portion or whole of the information transmitted over the other communication path. As a result, despite the use of a plurality of communication paths, the transmission bandwidth used for transmission of the video data is the same as the transmission bandwidth that would be used when transmitting the video data over a single communication path.

According to one aspect of the invention, a video encoding apparatus is provided. The video encoding apparatus includes: an encoder configured to encode video data by encoding key data that can be encoded without referring to other data in the video data, first dependent data that is encoded by referring to the key data, and second dependent data that is encoded by referring at least to the first dependent data; and a communication processor configured to transmit the encoded key data and the encoded first dependent data to a video decoding apparatus via a first communication path, and to transmit the encoded key data and the encoded second dependent data to the video decoding apparatus via a second communication path which is different from the first communication path.

According to another aspect of the invention, a video transmission system which includes a video encoding apparatus and a video decoding apparatus connected to the video encoding apparatus via a first communication path and a second communication path which is different from the first communication path is provided. In the video transmission system, the video encoding apparatus includes: an encoder configured to encode video data by encoding key data that can be encoded without referring to other data in the video data, first dependent data that is encoded by referring to the key data, and second dependent data that is encoded by referring at least to the first dependent data; and a communication processor configured to transmit the encoded key data and the encoded first dependent data to the video decoding apparatus via the first communication path, and to transmit the encoded key data and the encoded second dependent data to the video decoding apparatus via the second communication path which is different from the first communication path.

On the other hand, the video decoding apparatus includes: a receiver configured to receive the encoded key data and the encoded first dependent data from the first communication path, and to receive the encoded key data and the encoded second dependent data from the second communication path; and a decoder configured to decode the encoded key data, the encoded first dependent data, and the encoded second dependent data.

According to still another aspect of the invention, a video decoding apparatus is provided. The video decoding apparatus includes: a receiver configured to receive, from a first communication path, key data encoded without referring to other data contained in video data, and first dependent data contained in the video data and encoded by referring to the key data, and to receive, from a second communication path different from the first communication path, the encoded key data and second dependent data contained in the video data and encoded by referring at least to the first dependent data; and a decoder configured to decode the key data and the first dependent data when the receiver has received the key data and the first dependent data from the first communication path but failed to receive the key data and the second dependent data from the second communication path, and to decode only the key data when the receiver has received the key data and the second dependent data from the second communication path but failed to receive the key data and the first dependent data from the first communication path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A video transmission system will be described below with reference to the drawings. In the video transmission system, a video encoding apparatus encodes each picture contained in video data and transmits the encoded picture data to a video decoding apparatus over a plurality of communication paths.

More specifically, the video encoding apparatus encodes key data that can be encoded without referring to other encoded data, and outputs the encoded key data onto the plurality of communication paths. Further, the encoding apparatus encodes first dependent data that is encoded by referring to the key data, and outputs the encoded first dependent data onto one of the communication paths. Furthermore, the encoding apparatus encodes second dependent data that is encoded by referring at least to the first dependent data, and outputs the encoded second dependent data onto another one of the communication paths. In this way, the video transmission system enhances the reliability of transmission by transmitting the key data over multiple communication paths, and increases the transmission bandwidth for video data transmission by transmitting other data than the key data over respectively designated ones of the plurality of communication paths.

The picture may be either a frame or a field. A frame is one complete still image contained in the video data, while a field is a still image obtained by extracting data only in the odd-numbered lines or even-numbered lines from one frame. Further, the video data may represent a color video image or a monochrome video image.

Figure 1:
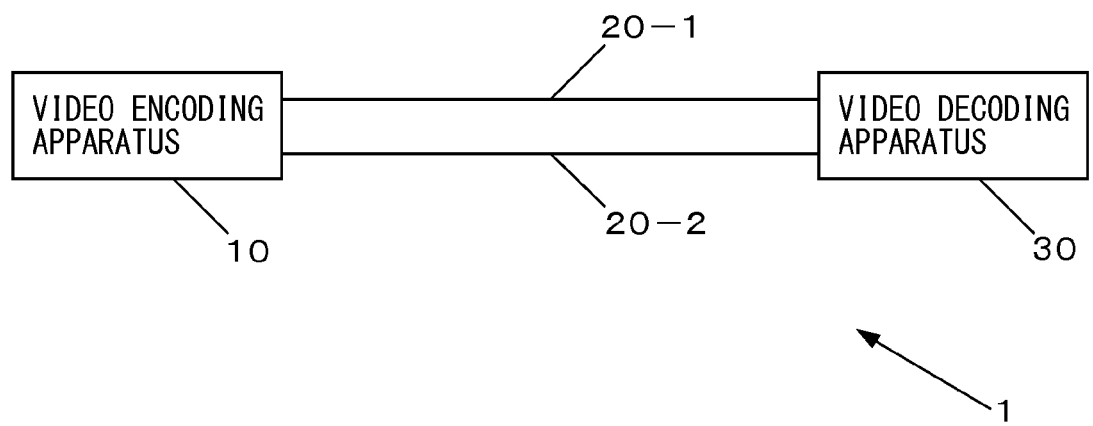
FIG. 1 is a diagram schematically illustrating the configuration of a video transmission system according to one embodiment.

FIG. 1 is a diagram schematically illustrating the configuration of a video transmission system according to one embodiment. The video transmission system 1 includes a video encoding apparatus 10, two communication paths 20-1 and 20-2, and a video decoding apparatus 30.

The video encoding apparatus 10 generates the key data, first dependent data, and second dependent data by encoding and compressing the video data. Then, the video encoding apparatus 10 transmits the key data and the first dependent data to the video decoding apparatus 30 via the communication path 20-1, and transmits the key data and the second dependent data to the video decoding apparatus 30 via the communication path 20-2.

The video decoding apparatus 30 reconstructs the original video data by decoding the key data, first dependent data, and second dependent data received via the communication paths 20-1 and 20-2.

The communication paths 20-1 and 20-2 may be, for example, communication paths conforming to the TCP (Transmission Control Protocol) and IP (Internet Protocol) standards. Alternatively, the communication paths 20-1 and 20-2 may be communication paths conforming to other communication standards. Further, the communication paths 20-1 and 20-2 may be physically different communication paths or may be physically the same communication path but different communication channels to be set up over the communication path. In the latter case, the signal frequency used to convey data may be different for each communication channel.

The video encoding apparatus 10 and the video decoding apparatus 30 will be described in detail below.

Figure 2:
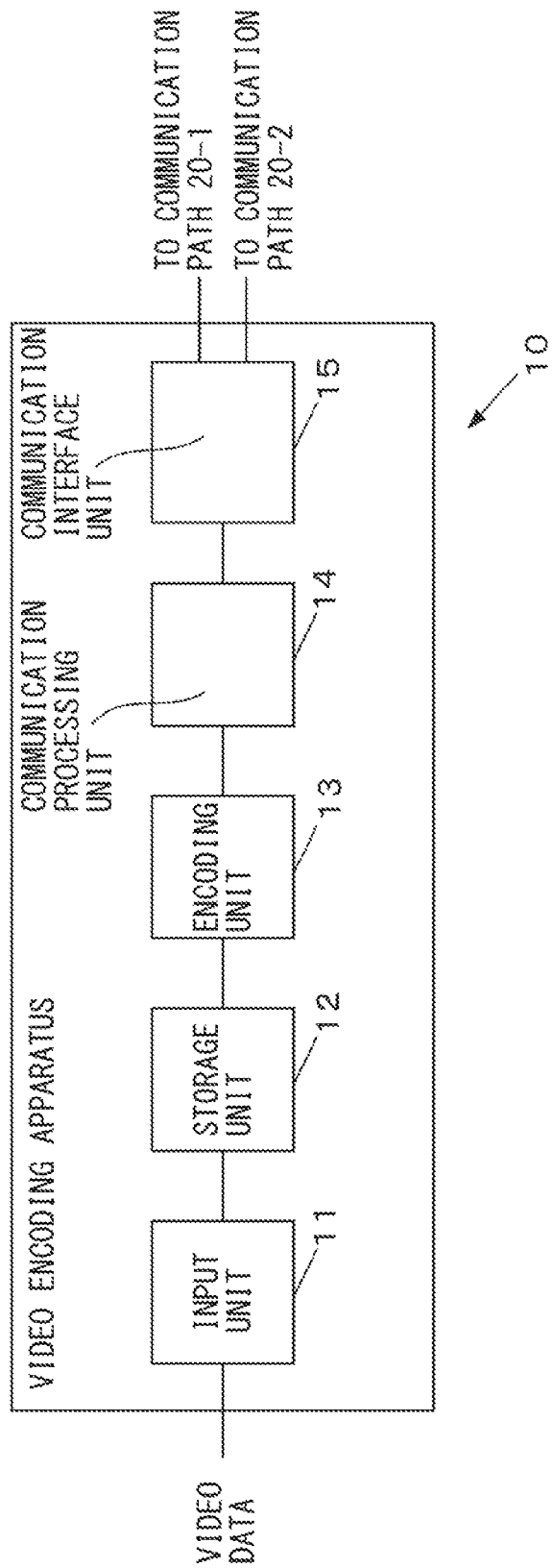
FIG. 2 is a diagram schematically illustrating the configuration of a video encoding apparatus.

FIG. 2 is a diagram schematically illustrating the configuration of the video encoding apparatus 10. The video encoding apparatus 10 includes an input unit 11, a storage unit 12, an encoding unit 13, a communication processing unit 14, and a communication interface unit 15. The input unit 11, the storage unit 12, the encoding unit 13, the communication processing unit 14, and the communication interface unit 15 are constructed, for example, as separate circuits, and are interconnected by signal lines. Alternatively, the encoding unit 13 and the communication processing unit 14 may be implemented as functional modules by a program executed on a single processor.

The input unit 11 acquires the video data to be transmitted. For this purpose, the input unit 11 includes, for example, a video interface unit for connecting the video encoding apparatus 10 to a video data generating apparatus. The video data acquired via the input unit 11 is stored in the storage unit 12. Alternatively, the video data acquired via the input unit 11 may be directly passed to the encoding unit 13.

The storage unit 12 includes, for example, a readable/writable volatile semiconductor memory circuit. The storage unit 12 stores the video data to be transmitted. The storage unit 12 may also store the encoded data (key data, first dependent data, and second dependent data) obtained by encoding and compressing the video data. Alternatively, the storage unit 12 may temporarily store data, etc. generated when encoding and compressing the video data to be transmitted.

The encoding unit (encoder) 13 encodes the key data, first dependent data, and second dependent data contained in the video data to be transmitted. More specifically, the encoding unit 13 compresses and encodes the key data, first dependent data, and second dependent data contained in the video data, for example, in accordance with the MPEG-2 standard devised by the Moving Picture Experts Group (MPEG). Alternatively, the encoding unit 13 may encode and compress the key data, first dependent data, and second dependent data contained in the video data, in accordance with MPEG-4, H.264/MPEG-4 AVC, or H.265.

In the present embodiment, the encoding unit 13 identifies each picture as an I picture, a P picture, or a B picture in accordance with the Group of Pictures (GOP) structure specified by a control unit (not depicted). The I picture is an intra-predictive encoded picture. The P picture is a picture that can be inter-predictive encoded from only one direction. The B picture is a picture that can be inter-predictive encoded from two directions. The intra-predictive coding is a coding scheme that encodes a target picture by only using information within the target picture. The unidirectional inter-frame predictive coding is a coding scheme that encodes a target picture by referring to a picture earlier than the target picture in playback order. On the other hand, the bidirectional inter-frame predictive coding is a coding scheme that encodes a target picture by referring to pictures in two directions in playback order (for example, a picture earlier and a picture later than the target picture in playback order).

The I picture can be encoded without referring to other picture information. Therefore, in the present embodiment, the video encoding apparatus 10 designates the I picture as the key data. The P picture can be encoded by referring to the information of an I or P picture earlier in encoding and decoding order. Therefore, in the present embodiment, the video encoding apparatus 10 designates each P picture contained in the GOP as the first dependent data. On the other hand, the B picture is encoded by referring to the information of one or more of I, P, and B pictures that precede it in encoding and decoding order. Then, at least one B picture refers to a P picture that precedes it in decoding and encoding order. In the present embodiment, therefore, the video encoding apparatus 10 designates each B picture contained in the GOP as the second dependent data.

Figure 3:
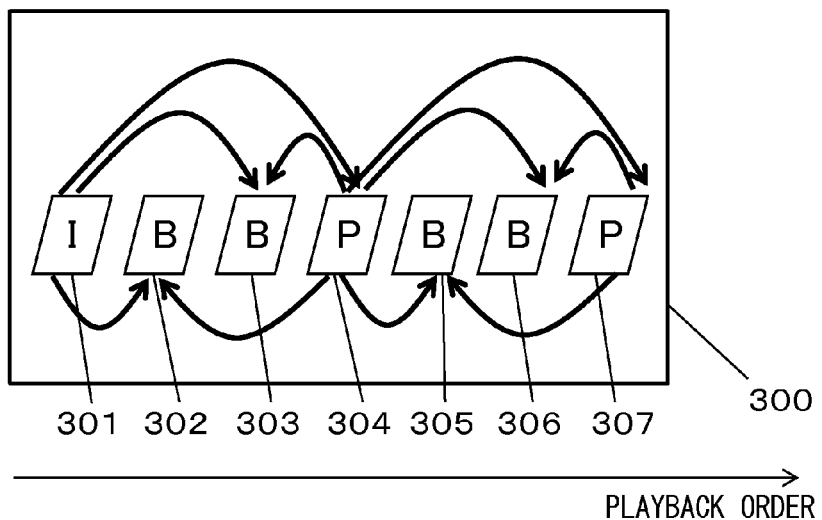
FIG. 3 is a diagram illustrating one example of a GOP.

FIG. 3 is a diagram illustrating one example of a GOP. In FIG. 3, the horizontal axis represents the picture playback order. Further, in FIG. 3, arrows indicate the reference relations among the respective pictures. In the example illustrated in FIG. 3, seven pictures constitute one GOP 300. In the GOP 300, the picture 301 at the head is the I picture, and the fourth picture 304 from the head and the picture 307 at the end are the P pictures. The four intervening pictures 302, 303, 305, and 306 are the B pictures. In the illustrated example, the P picture 304 is encoded by referring to the I picture 301. Further, the P picture 307 is encoded by referring to the P picture 304. On the other hand, the B pictures 302 and 303 are each encoded by referring to the I picture 301 and the P picture 304. The B pictures 305 and 306 are each encoded by referring to the P pictures 304 and 307.

The encoding unit 13 reorders the pictures in encoding order. In the example of FIG. 3, the encoding unit 13 reorders the pictures, for example, in the following order: the I picture 301, the P picture 304, the B picture 302, the B picture 303, the P picture 307, the B picture 305, and the B picture 306.

The encoding unit 13 divides the I picture into a plurality of blocks, and encodes each block by intra-predictive coding. Further, the encoding unit 13 divides each P picture into a plurality of blocks, and encodes each block, for example, by selecting the unidirectional inter-predictive coding scheme or the intra-predictive coding scheme, whichever scheme yields the smaller amount of coding. In this case, if the unidirectional inter-predictive coding scheme is selected, the encoding unit 13 encodes the block by referring to the already encoded I picture or P picture.

Further, the encoding unit 13 divides each B picture into a plurality of blocks, and encodes each block, for example, by selecting from among the bidirectional inter-predictive coding scheme, the unidirectional inter-predictive coding scheme, and the intra-predictive coding scheme, the coding scheme that yields the smallest amount of coding. In this case, if the bidirectional or unidirectional inter-predictive coding scheme is selected, the encoding unit 13 encodes the block by referring to the already encoded I picture, P picture, or B picture.

The encoding unit 13 sequentially packetizes the data of each encoded picture in encoding order. For example, the encoding unit 13 packetizes the data of each encoded picture in accordance with the MPEG-2 transport stream (TS) format. Accordingly, the earlier the picture is in encoding order, the smaller is the PID and continuity counter value contained in the MPEG-2 TS header information. The encoding unit 13 may generate the packets in accordance with a format referred to as the Timestamped TS (TSS) by appending 4-byte timestamp information at the head of each MPEG-2 TS packet. The encoding unit 13 passes each packet to the communication processing unit 14.

The communication processing unit (communication processor) 14 converts each packet received from the encoding unit 13 into a packet of a format that can be output on the communication paths 20-1 and 20-2. Then, the communication processing unit 14 determines the communication path on which the packet is to be output, based on whether the encoded data contained in the packet is the key data, the first dependent data, or the second dependent data.

For example, when the communication paths 20-1 and 20-2 are communication paths that conform to TCP/IP, the communication processing unit 14 converts each MPEG-2 TS packet containing the encoded picture data, for example, into an IP packet. In this case, the communication processing unit 14 can convert the MPEG-2 TS packet containing the encoded picture data into an IP packet of RTP format, for example, by appending header information conforming to the real-time transport protocol (RTP).

Figure 4:
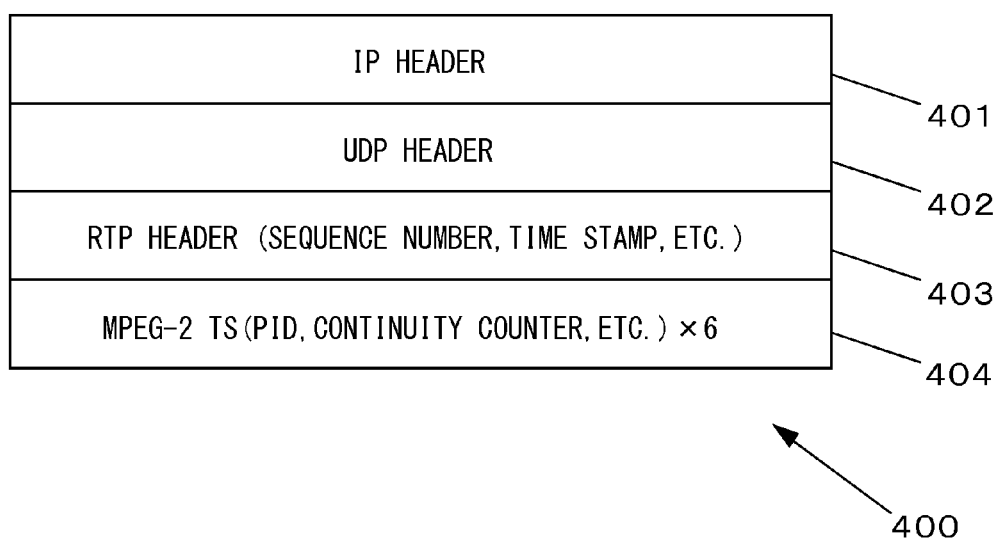
FIG. 4 is a diagram illustrating one example of an IP packet that conforms to RTP format.

FIG. 4 is a diagram illustrating one example of an IP packet that conforms to RTP format. The packet 400 includes a 20-byte long IP header 401, an 8-byte long UDP header 402, a 12-byte long RTP header 403, and a payload 404.

The IP header 401 stores data such as the address of the video decoding apparatus 30 as the destination. The UDP header 402 stores header information conforming to User Datagram Protocol (UDP), for example, packet data length, etc.

The RTP header 403 stores header information conforming to RTP, for example, packet sequence number assigned to each packet and time information such as time stamp. The communication processing unit 14 assigns smaller sequence numbers and smaller time stamps to IP packets containing encoded picture data earlier in encoding order.

The payload 404 stores encoded picture data packetized in accordance with MPEG-2 TS format. The payload 404 may contain a plurality of (for example, six) MPEG-2 TS packets. Each IP packet contains, for example, the encoded data of one picture.

The communication processing unit 14 may convert each packet containing the encoded picture data, for example, into an IP packet that does not conform to RTP format.

Figure 5:
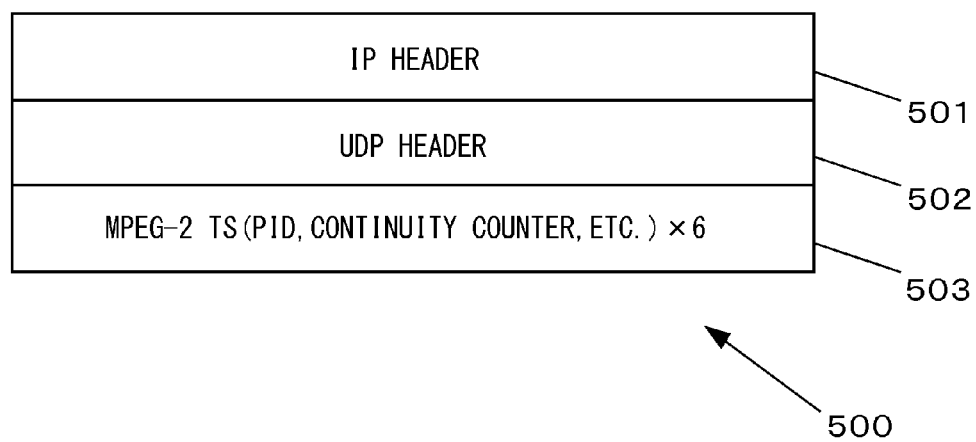
FIG. 5 is a diagram illustrating one example of an IP packet that does not conform to RTP format.

FIG. 5 is a diagram illustrating one example of an IP packet that does not conform to RTP format. The packet 500 includes a 20-byte long IP header 501, an 8-byte long UDP header 502, and a payload 503.

The IP header 501 stores data such as the address of the video decoding apparatus 30 as the destination. The UDP header 502 stores packet data length, etc. The payload 404 stores encoded picture data packetized in accordance with MPEG-2 TS format, as in the payload 503 of the IP packet 400 illustrated in FIG. 4.

Figure 6:
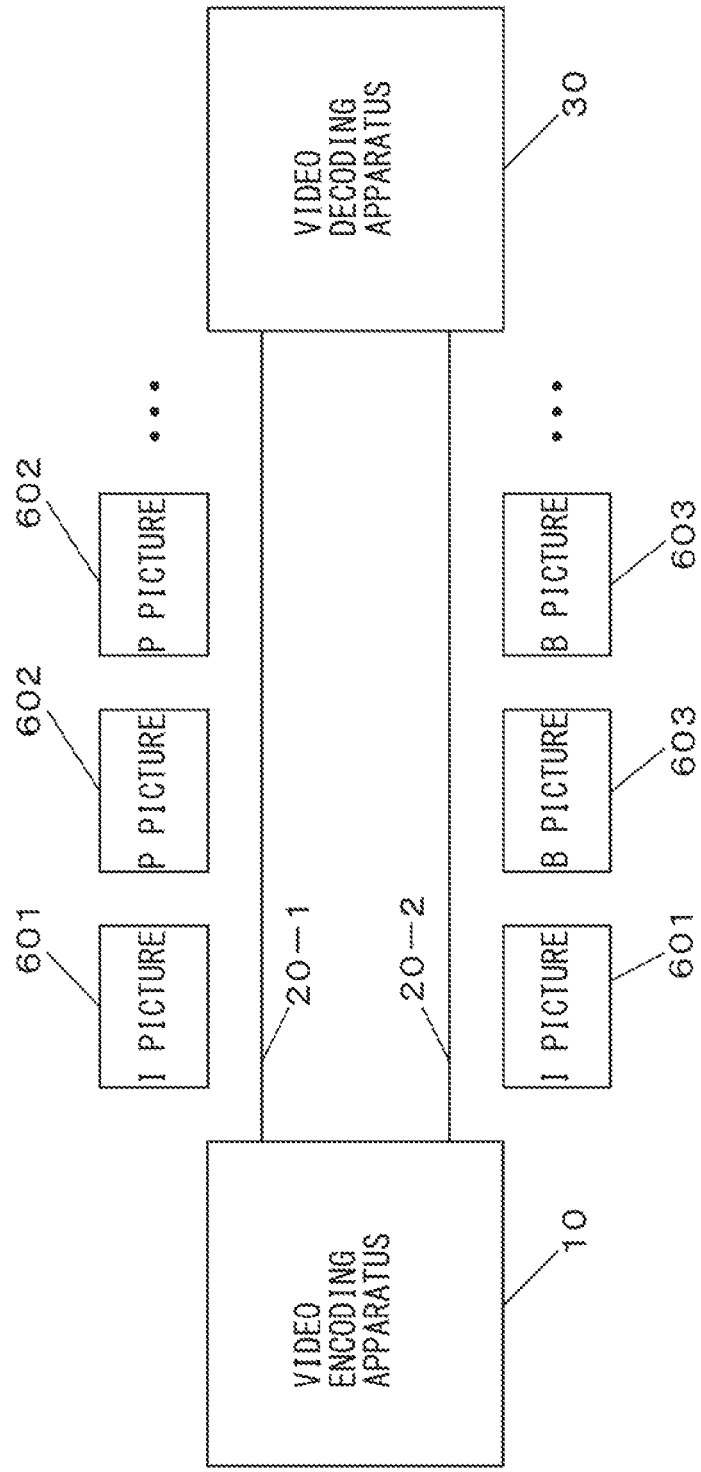
FIG. 6 is a diagram illustrating the relationship between the picture type contained in a packet and the communication path onto which the packet is output.

FIG. 6 is a diagram illustrating the relationship between the picture type contained in a packet and the communication path onto which the packet is output. In the present embodiment, the communication processing unit 14 outputs a packet 601 containing the encoded data of an I picture as the key data and a packet 602 containing the encoded data of a P picture as the first dependent data onto the communication path 20-1 via the communication interface unit 15. On the other hand, the communication processing unit 14 outputs the packet 601 containing the encoded data of the I picture as the key data and a packet 603 containing the encoded data of a B picture as the second dependent data onto the communication path 20-2 via the communication interface unit 15.

Therefore, if a communication failure occurs on one of the communication paths, the packet 601 containing the encoded data of the I picture transmitted over the other communication path reaches the video decoding apparatus 30. Specifically, if a communication failure occurs on the communication path 20-1, the packet 601 containing the encoded data of the I picture and the packet 603 containing the encoded data of the B picture reach the video decoding apparatus 30. In this case, the video decoding apparatus 30 is unable to decode the B and P pictures but is able to decode the I picture. As a result, the video decoding apparatus 30 can play back the video data by decoding and playing back the I pictures in time order, though the picture quality is lower than that of the original video data. In this case, the video data is played back in a manner similar to frame skipping.

On the other hand, if a communication failure occurs on the communication path 20-2, the packet 601 containing the encoded data of the I picture and the packet 602 containing the encoded data of the P picture reach the video decoding apparatus 30. In this case, the video decoding apparatus 30 is unable to decode the B picture but is able to decode the I and P pictures. Therefore, the video decoding apparatus 30 can decode and play back the I and P pictures in time order. As a result, the video decoding apparatus 30 can play back the video data with a higher picture quality than when the communication failure occurred on the communication path 20-1, though the picture quality is lower than that of the video data that would be played back when all the packets reached the video decoding apparatus 30.

Generally, the amount of encoded data per P picture is larger than the amount of encoded data per B picture. On the other hand, the number of P pictures contained in the GOP may be smaller than the number of B pictures. Therefore, as described above, the communication processing unit 14 performs processing to transmit the encoded data of the P picture and the encoded data of the B picture over different communication paths so that the difference in load between the communication paths can be reduced.

The communication interface unit 15 includes an interface for connecting the video encoding apparatus 10 to the communication paths 20-1 and 20-2. Then, the communication interface unit 15 outputs each packet received from the communication processing unit 14 onto the communication path 20-1 or 20-2.

Figure 7:
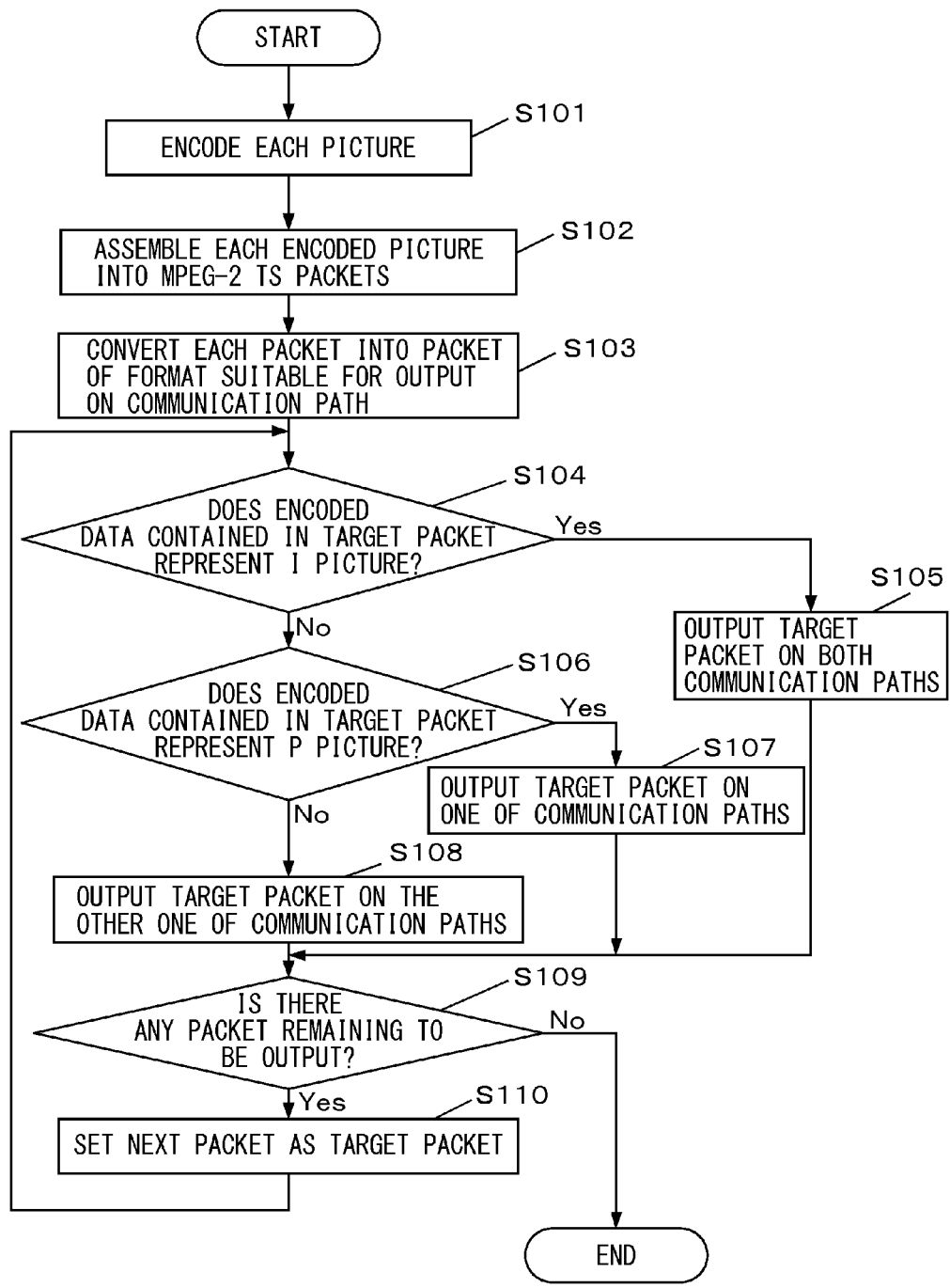
FIG. 7 is an operation flowchart of a video encoding process.

FIG. 7 is an operation flowchart of a video encoding process which is performed by the video encoding apparatus 10. When the video data is acquired via the input unit 11, the encoding unit 13 in the video encoding apparatus 10 encodes each picture contained in the video data (step S101). Then, the encoding unit 13 assembles the data of each encoded picture into MPEG-2 TS packets, and passes the packetized data to the communication processing unit 14 (step S102).

The communication processing unit 14 converts each packet of the encoded data into a packet of a format suitable for output on the communication path 20-1 or 20-2 (step S103). Then, the communication processing unit 14 examines the packet to determine whether the encoded data contained in the packet represents an I picture (step S104). If the encoded data represents an I picture, i.e., if the encoded data is the key data (Yes in step S104), the communication processing unit 14 outputs the packet on both the communication paths 20-1 and 20-2 via the communication interface unit 15 (step S105).

On the other hand, if the encoded data does not represent an I picture (No in step S104), then the communication processing unit 14 determines whether the encoded data contained in the packet represents a P picture (step S106). If the encoded data represents a P picture, i.e., if the encoded data is the first dependent data (Yes in step S106), the communication processing unit 14 outputs the packet on the communication path 20-1 via the communication interface unit 15 (step S107).

On the other hand, if the encoded data does not represent a P picture (No in step S106), it is determined that the encoded data represents a B picture, i.e., the encoded data is the second dependent data. Therefore, the communication processing unit 14 outputs the packet containing the encoded data on the communication path 20-2 via the communication interface unit 15 (step S108).

After step S105, S107, or S108, the communication processing unit 14 determines whether there is any packet remaining to be output (step S109). If there is any packet remaining to be output (Yes in step S109), the communication processing unit 14 sets that packet as the next packet to be examined (step S110). Then, the communication processing unit 14 repeats the process from step S104 onward. On the other hand, if there is no longer any packet remaining to be output (No in step S109), the video encoding apparatus 10 terminates the video transmission process.

Figure 8:
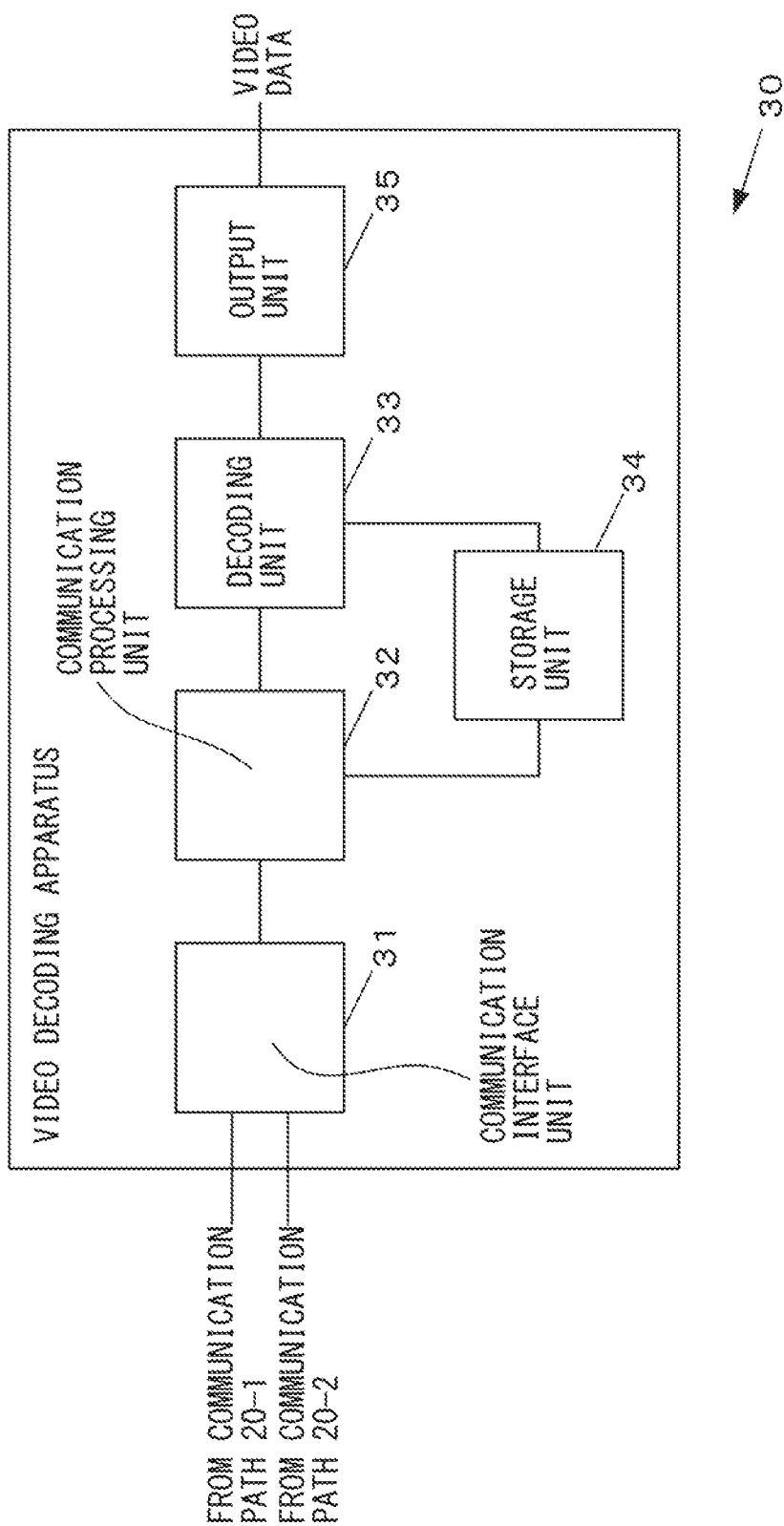
FIG. 8 is a diagram schematically illustrating the configuration of a video decoding apparatus.

Next, the video decoding apparatus 30 will be described. FIG. 8 is a diagram schematically illustrating the configuration of the video decoding apparatus 30. The video decoding apparatus 30 includes a communication interface unit 31, a communication processing unit 32, a decoding unit 33, a storage unit 34, and an output unit 35. The communication interface unit 31, the communication processing unit 32, the decoding unit 33, the storage unit 34, and the output unit 35 are constructed, for example, as separate circuits, and are interconnected by signal lines. Alternatively, the communication processing unit 32 and the decoding unit 33 may be implemented as functional modules by a program executed on a single processor.

The communication interface unit 31 is one example of a receiver, and includes an interface for connecting the video decoding apparatus 30 to the communication paths 20-1 and 20-2. The communication interface unit 31 receives a packet containing the encoded key data and a packet containing the encoded first dependent data from the communication path 20-1. Further, the communication interface unit 31 receives a packet containing the encoded key data and a packet containing the encoded second dependent data from the communication path 20-2. Then, the communication interface unit 31 passes the received packets to the communication processing unit 32.

The communication processing unit (communication processor) 32 stores the packets received via the communication interface unit 31 in the storage unit 34. Further, the communication processing unit 32 retrieves the encoded picture data from the packets (IP packets and MPEG-2 TS packets within IP packets). Then, by referring to the header information of the packets, the communication processing unit 32 arranges the encoded picture data in the order in which the pictures were encoded, and passes the data to the decoding unit 33 in the same order. In this embodiment, the encoded data of the I picture was transmitted in duplicate. Therefore, the communication processing unit 32 refers to packet header information to see whether a packet has been received that contains the same content as the content of any one of the packets already received and stored in the storage unit 34. The communication processing unit 32 discards any packet containing the same content as the content of any one of the already received packets.

The packet header information used to identify the encoding order and to determine the presence or absence of a packet received in duplicate may be, for example, the sequence number or time stamp contained in the RTP header. Since the video encoding apparatus 10 outputs the pictures in the order in which they were encoded, the sequence number is smaller and the time indicated by the time stamp is earlier for a packet containing the encoded data of a picture earlier in encoding order.

In view of the above, each time a packet is received, the communication processing unit 32 stores the packet in the storage unit 34 for a predetermined length of time. Then, the communication processing unit 34 retrieves the encoded data from the packets, arranges the encoded data in increasing order of the sequence number or in chronological order of the time stamp, and passes the encoded data to the decoding unit 33 in the order. Further, when a packet is received that has the same sequence number or time stamp as the sequence number or time stamp of any one of the packets stored in the storage unit 34, the communication processing unit 32 discards the received packet. In this way, by examining the encoding order, etc., using the RTP header information, the communication processing unit 32 can identify the encoding order, etc., of the encoded data without having to analyze the contents of the MPEG-2 TS packet.

The communication processing unit 32 may use the PID or continuity counter value contained in MPEG-2 TS header information as the header information to be used to identify the encoding order and to determine the presence or absence of a packet received in duplicate. In this case also, the communication processing unit 34 retrieves the encoded data from the packets, arranges the encoded data in increasing order of the PID or continuity counter value, and passes the encoded data to the decoding unit 33 in the order.

The decoding unit (decoder) 33 decodes each picture contained in the encoded video data by using the same video coding scheme used to encode the video data. Then, the decoding unit 33 rearranges the pictures in playback order and passes them to the output unit 35.

When the video decoding apparatus 30 has successfully received the encoded data of all the pictures contained in the video data, the decoding unit 33 can decode all the pictures. If, for example, a communication failure occurs on the communication path 20-1, the video decoding apparatus 30 can still receive the packet containing the encoded data of the I picture and the packet containing the encoded data of the B picture transmitted over the other communication path 20-2. However, because of a failure to receive the encoded data of the P picture by reference to which the B picture was encoded, the decoding unit 33 is unable to decode the B picture, but it can decode the I picture. Therefore, the decoding unit 33 decodes the I picture, and arranges the decoded I pictures in playback order.

On the other hand, if a communication failure occurs on the communication path 20-2, the video decoding apparatus 30 can still receive the packet containing the encoded data of the I picture and the packet containing the encoded data of the P picture transmitted over the communication path 20-1. In this case, the decoding unit 33 can decode the P picture as well as the I picture, because the I picture by reference to which the P picture was encoded has been successfully received. Therefore, the decoding unit 33 decodes the I and P pictures, and arranges them in playback order. As a result, the video decoding apparatus 30 can play back the video data with a higher picture quality than when the communication failure occurred on the communication path 20-1, though the picture quality is lower than that of the video data that would be played back when all the packets reached the video decoding apparatus 30.

The storage unit 34 includes, for example, a readable/writable volatile semiconductor memory circuit. The storage unit 34 stores data, etc., generated when decoding the received encoded video data. The storage unit 34 may also store temporarily the packets that the communication processing unit 32 received.

The output unit 35 includes, for example, an interface circuit for connecting the video decoding apparatus 30 to a display device such as a liquid crystal display. The output unit 35 receives the pictures from the decoding unit 33 in playback order, and outputs them to the display device in the same playback order.

Figure 9:
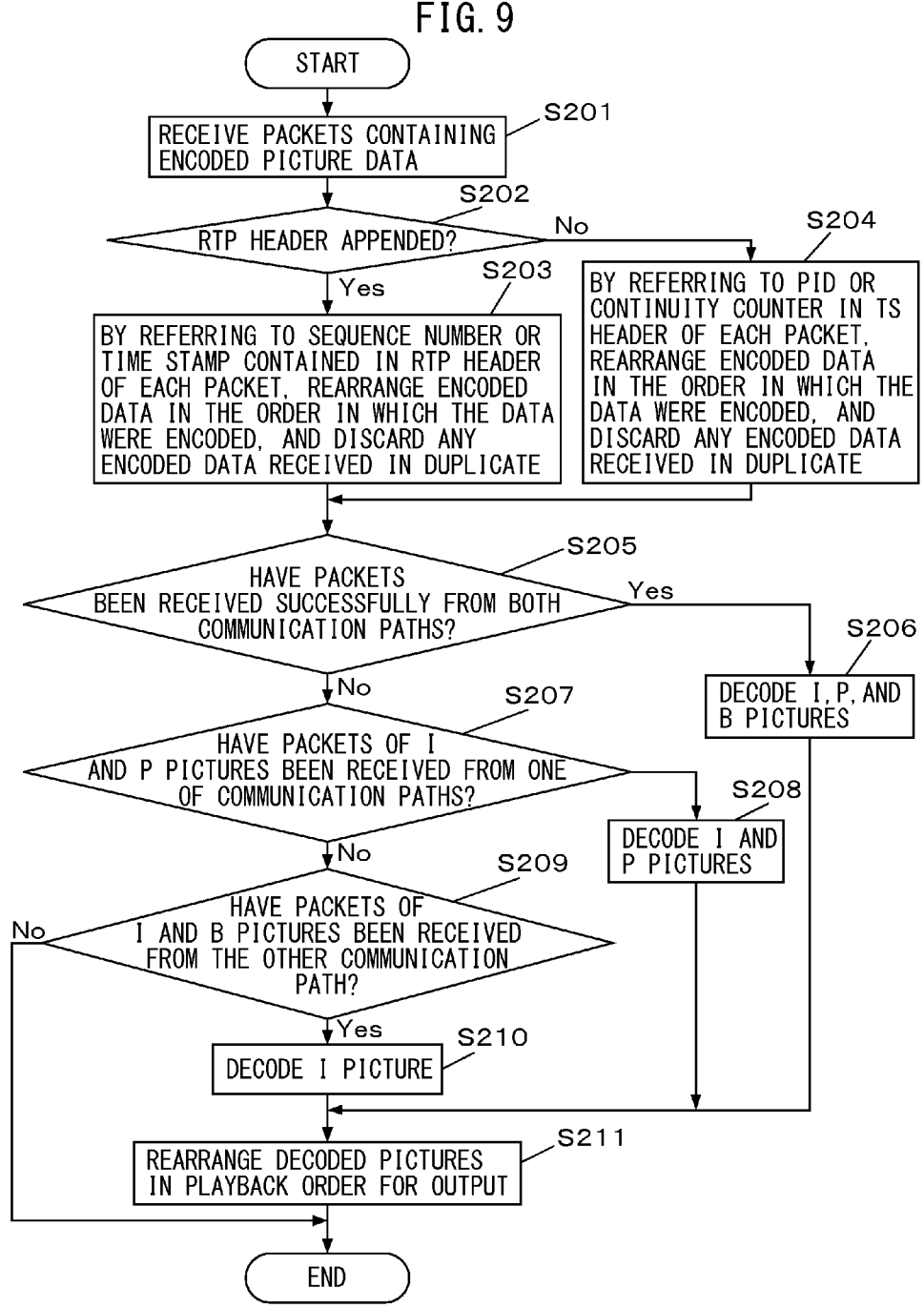
FIG. 9 is an operation flowchart of a video decoding process.

FIG. 9 is an operation flowchart of a video decoding process which is performed by the video decoding apparatus 30. The communication processing unit 32 sequentially receives a plurality of packets containing encoded picture data from the communication path 20-1 or 20-2 via the communication interface unit 31 (step S201). The communication processing unit 32 checks to see whether each packet includes an RTP header (step S202). The setting as to whether an RTP header is to be appended to each packet is made in advance, for example, between the video encoding apparatus 10 and the video decoding apparatus 30. If each packet includes an RTP header (Yes in step S202), the communication processing unit 32 extracts encoded data from each received packet. Then, by referring to the sequence number or time stamp contained in the RTP header of each packet, the communication processing unit 32 rearranges the encoded data in the order in which the data were encoded, and discards any encoded data received in duplicate (step S203).

On the other hand, if no packet includes an RTP header (No in step S202), the communication processing unit 32 extracts encoded data from each received packet. Then, by referring to the PID or continuity counter value contained in the MPEG-2 TS header information of each packet, the communication processing unit 32 rearranges the encoded data in the order in which the data were encoded, and discards any encoded data received in duplicate (step S204).

After step S203 or S204, the communication processing unit 32 proceeds to determine whether the packets containing the encoded data have been received successfully from both of the communication paths (step S205). If the packets containing the encoded data have been received successfully from both of the communication paths (Yes in step S205), the decoding unit 33 decodes the I, P, and B pictures from the encoded data (step S206).

On the other hand, if the packets containing the encoded data have not been received successfully from one or the other of the communication paths (No in step S205), then the communication processing unit 32 determines whether or not the packets containing the encoded data of the I or P pictures have been received from the communication path 20-1 (step S207). If the packets containing the encoded data have been received from the communication path 20-1 (Yes in step S207), the decoding unit 33 decodes the I and P pictures from the encoded data (step S208).

On the other hand, if the packets containing the encoded data have not been received successfully from the communication path 20-1 (No in step S207), then the communication processing unit 32 determines whether or not the packets containing the encoded data of the I or B pictures have been received from the communication path 20-2 (step S209). If the packets containing the encoded data have been received from the communication path 20-2 (Yes in step S209), the decoding unit 33 decodes the I pictures from the encoded data (step S210). If the packets containing the encoded data have not been received successfully from the communication path 20-2 (No in step S209), then the video decoding apparatus 30 determines that packets have been received successfully from neither of the communication paths, and terminates the video decoding process without decoding any video data.

After step S206, S208, or S210, the decoding unit 33 rearranges the decoded pictures in playback order, and outputs the pictures in the same playback order via the output unit 35 (step S211). Thereafter, the video decoding apparatus 30 terminates the video decoding process.

As has been described above, in the video transmission system, the video encoding apparatus transmits the encoded key data to the video decoding apparatus over a plurality of communication paths. On the other hand, the video encoding apparatus transmits the encoded first dependent data and the encoded second dependent data to the video decoding apparatus over respectively designated ones of the communication paths. Since the key data is transmitted in multiple copies over the plurality of communication paths, the reliability of the key data transmission is enhanced. On the other hand, since the first dependent data and the second dependent data are transmitted over the respectively designated communication paths, the communication bandwidth used for the transmission of the video data is wider than when transmitting all the data over a single communication path. Accordingly, the video transmission system can enhance the reliability of the video data transmission while increasing the communication bandwidth to be used for the transmission of the video data.

Depending on the video transmission system, priority may be given to the real-time transmission of the video data, and therefore, the video encoding apparatus may encode the pictures in playback order without reordering the pictures for encoding. In this case, the GOP does not contain B pictures, and therefore each picture is encoded as an I picture or a P picture.

Therefore, according to a modified example, the video encoding apparatus 10 may be configured so that one or more P pictures encoded by referring to the I picture are set as the first dependent data and one or more other P pictures encoded by referring to the P pictures contained in the first dependent data are set as the second dependent data.

Figure 10:
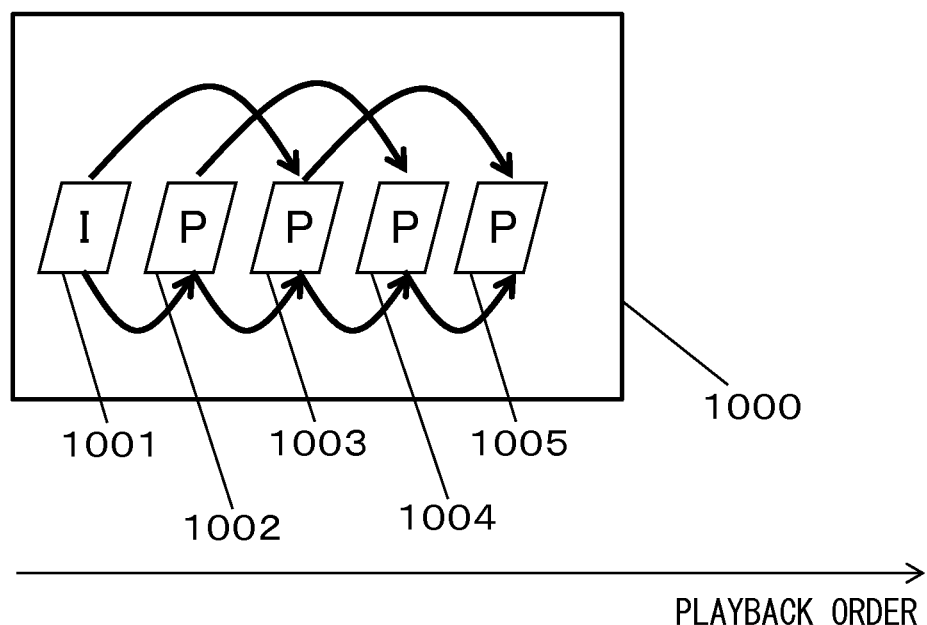
FIG. 10 is a diagram illustrating one example of a GOP according to a modified example.

FIG. 10 is a diagram illustrating one example of a GOP according to the above modified example. In FIG. 10, the horizontal axis represents the picture playback order, and arrows indicate the reference relations among the respective pictures. In the illustrated example, the GOP 1000 contains one I picture 1001 and four P pictures 1002 to 1005 that follow the I picture 1001. Each P picture is encoded by referring to a predetermined number of previously encoded pictures. For example, it is assumed that each P picture can refer to two encoded pictures immediately preceding it. In this case, the P pictures 1002 and 1003 can both refer to the I picture 1001, but neither of the P pictures 1004 and 1005 can refer to the I picture 1001. Therefore, the video encoding apparatus 10 can set the I picture 1001 as the key data, the P pictures 1002 and 1003 as the first dependent data, and the pictures 1004 and 1005 as the second dependent data.

In the video transmission system according to the above modified example that does not use B pictures, the communication path to be used to transmit the encoded data of each P picture is selected according to which picture the P picture refers to. Accordingly, the video transmission system according to the modified example can increase the communication bandwidth while enhancing the reliability of the video data transmission.

According to another modified example, the video encoding apparatus 10 may encode each picture contained in the video data by dividing the picture into layers and may select the output communication path according to each layer.

Figure 11:
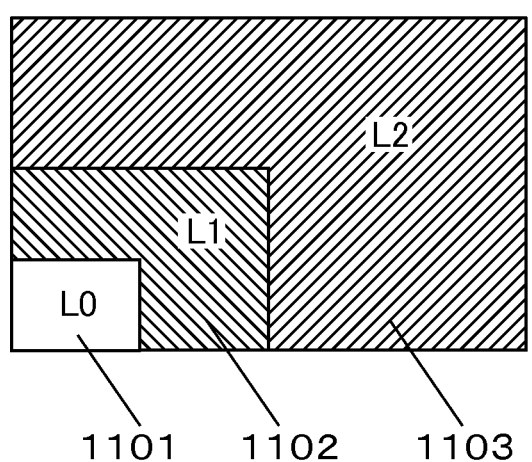
FIG. 11 is a diagram illustrating one example of how layers are set for each picture.

FIG. 11 is a diagram illustrating one example of how the layers are set for each picture. In the illustrated example, the picture is spatially divided into three layers L0, L1, and L2. Of these layers, the layer L0 is also referred to as a base layer, has the lowest resolution, and is generated, for example, by performing processing such as decimating pixels from the original picture. The layers L1 and L2 are also referred to as enhancement layers. By combining the data of the layer L1 with the data of the layer L0, a picture is reconstructed that has a resolution lower than that of the original picture but higher than that of a picture that would be reconstructed based only on the data of the layer L0. By combining the data of the layer L2 with the data of the layer L0 and the data of the layer L1, a picture having the same resolution as the original picture is reconstructed. For example, when the original picture has a resolution of 720 pixels vertically and 1280 pixels horizontally, a picture 1101 with a resolution of 240 pixels vertically and 352 pixels horizontally is reconstructed from the data of the layer L0. When the data of the layer L1 is combined with the data of the layer L0, a picture 1102 with a resolution of 480 pixels vertically and 720 pixels horizontally is reconstructed. When the data of all the layers are combined, a picture 1103 with a resolution of 720 pixels vertically and 1280 pixels horizontally is reconstructed.

The encoding unit 13 in the video encoding apparatus 10 encodes the data of the layer L0 of each picture, for example, by intra-predictive coding or inter-predictive coding without referring to the data of the other layers. Further, the encoding unit 13 enlarges the picture reconstructed from the data of the layer L0 of the already encoded picture or the data of the layer L0 of the picture being encoded, in such a manner that the number of pixels in the enlarged picture becomes equal to the number of pixels in the picture reconstructed from the data of the layers L1 and L0. Then, the encoding unit 13 calculates the difference between the picture corresponding to the data of the layers L0 and L1 of the picture being encoded and the enlarged picture of the layer L0, and encodes the difference as the data of the layer L1.

Similarly, the encoding unit 13 enlarges the picture reconstructed from the data of the layers L0 and L1 of the already encoded picture or the data of the layers L0 and L1 of the picture being encoded, in such a manner that the number of pixels in the enlarged picture becomes equal to the number of pixels in the picture being encoded. Then, the encoding unit 13 calculates the difference between the entire picture being encoded and the enlarged picture of the layers L0 and L1, and encodes the difference as the data of the layer L2.

Figure 12:
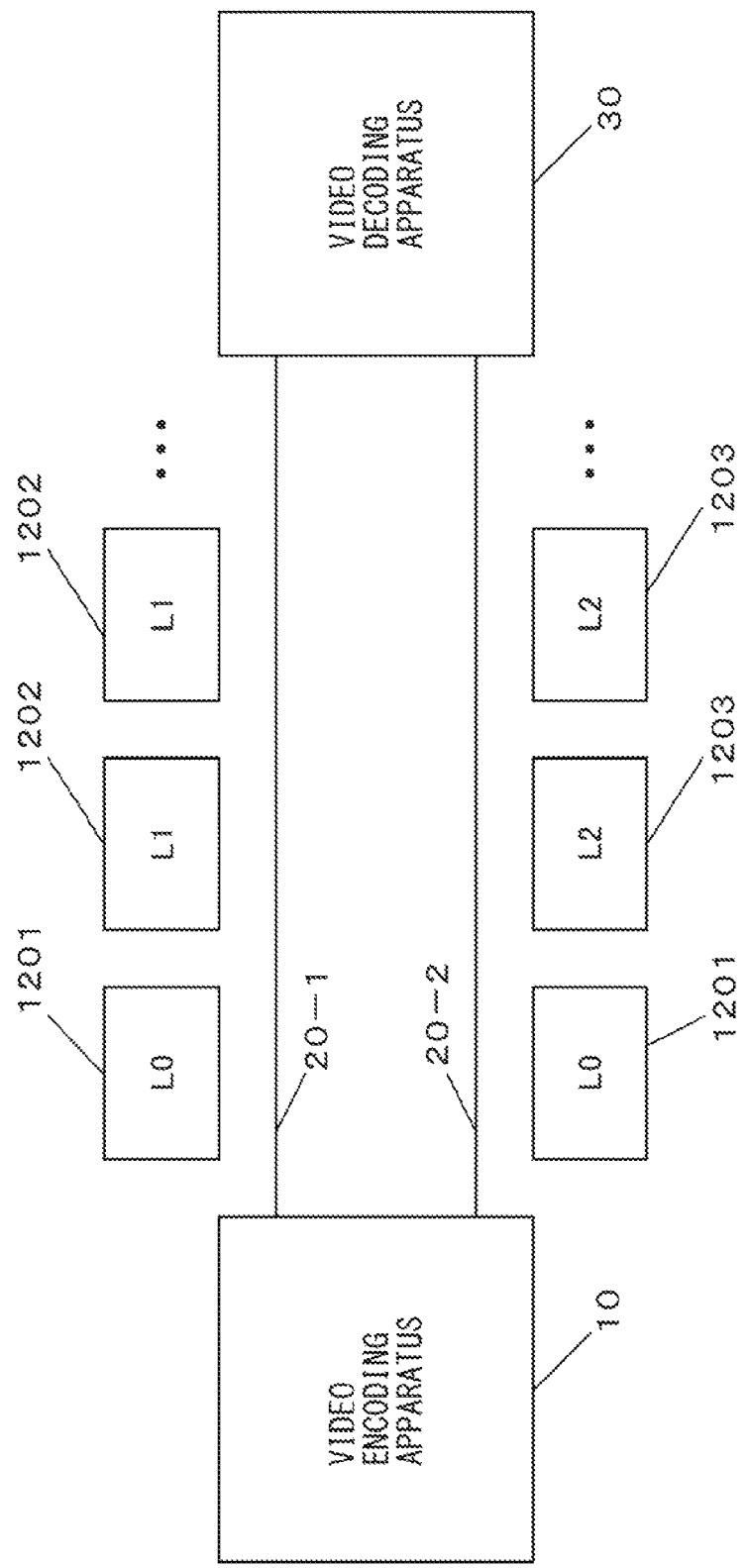
FIG. 12 is a diagram illustrating the relationship between the layer type contained in a packet and the communication path onto which the packet is output for the case where layered coding is used for picture encoding.

FIG. 12 is a diagram illustrating the relationship between the layer type contained in a packet and the communication path onto which the packet is output according to the above modified example.

The communication processing unit 14 outputs a packet 1201 containing the encoded data of the layer L0 onto both the communication paths 20-1 and 20-2 via the communication interface unit 15. On the other hand, the communication processing unit 14 outputs a packet 1202 containing the encoded data of the layer L1 onto the communication path 20-1 via the communication interface unit 15. Further, the communication processing unit 14 outputs a packet 1203 containing the encoded data of the layer L2 onto the communication path 20-2 via the communication interface unit 15.

In the above arrangement, if a communication failure occurs on the communication path 20-1, the video decoding apparatus 30 is no longer able to receive the packets transmitted over the communication path 20-1, but can receive the encoded data of the layers L0 and L2. As a result, the video decoding apparatus 30 can reconstruct a picture having a resolution corresponding to the layer L0.

On the other hand, if a communication failure occurs on the communication path 20-2, the video decoding apparatus 30 is no longer able to receive the packets transmitted over the communication path 20-2, but can receive the encoded data of the layers L0 and L1. As a result, the video decoding apparatus 30 can reconstruct a picture having a resolution corresponding to the combination of the layers L0 and L1.

Figure 13:
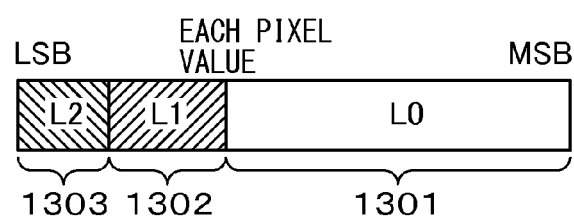
FIG. 13 is a diagram illustrating another example of how layers are set for each picture.

FIG. 13 is a diagram illustrating another example of how the layers are set for each picture. This example is referred to as SNR layered coding, and each picture is divided into three layers L0, L1, and L2 according to the number of gray scale levels, i.e., the bit string representing each pixel value. Of these layers, the layer L0 is represented by a bit string 1301 of a predetermined length (for example, 8 bits) as counted from the most significant bit (MSB) in the bit string (for example, 12 bits) representing the pixel value of the original picture. The layer L1 is a bit string 1302 of a predetermined length (for example, 2 bits), lower than the bit string of the layer L0, and the layer L2 is a bit string 1303 of a predetermined length (for example, 2 bits) as counted from the least significant bit (LSB).

In the case of the picture reconstructed from the data of the layer L0, a false contour may appear on the picture because the number of gray scale levels representing each pixel value is small. On the other hand, in the case of the picture reconstructed by combining the data of the layer L0 with the data of the layer L1, the number of layers (for example, 10 bits) used to represent the pixel value is smaller than the number of gray scale levels representing the pixel value of the original picture, but is larger than the number of gray scale levels representing the pixel value of the picture reconstructed only from the data of the layer L0. As a result, the picture reconstructed by combining the data of the layer L0 with the data of the layer L1 is smoother than the picture reconstructed only from the data of the layer L0. Further, by combining the data of all the layers, a picture is reconstructed that has the pixel value corresponding to the same number of gray scale levels as the number of gray scale levels used to represent the pixel value of the original picture.

The encoding unit 13 in the video encoding apparatus 10 encodes the data of the layer L0 of each picture, for example, by intra-predictive coding or inter-predictive coding without referring to the data of the other layers. Further, when encoding the data of the layer L1 of the picture being encoded, the encoding unit 13 calculates the difference between the picture reconstructed from the data of the layers L0 and L1 of the picture being encoded and the picture reconstructed from the layer L0 of the picture being encoded or of the already encoded picture. Then, the encoding unit 13 encodes the difference.

Similarly, when encoding the data of the layer L2 of the picture being encoded, the encoding unit 13 calculates the difference between the picture reconstructed from the data of all the layers of the picture being encoded and the picture reconstructed from the layers L0 and L1 of the picture being encoded or of the already encoded picture. Then, the encoding unit 13 encodes the difference.

In this example, the communication processing unit 14 also outputs the packet containing the encoded data of the layer L0 onto both the communication paths 20-1 and 20-2 via the communication interface unit 15. On the other hand, the communication processing unit 14 outputs the packet containing the encoded data of the layer L1 onto the communication path 20-1 via the communication interface unit 15. Further, the communication processing unit 14 outputs the packet containing the encoded data of the layer L2 onto the communication path 20-2 via the communication interface unit 15.

In the above arrangement, if a communication failure occurs on the communication path 20-1, the video decoding apparatus 30 is no longer able to receive the packets transmitted over the communication path 20-1, but can receive the encoded data of the layers L0 and L2. As a result, the video decoding apparatus 30 can reconstruct the picture having the number of gray scale levels corresponding to the layer L0.

On the other hand, if a communication failure occurs on the communication path 20-2, the video decoding apparatus 30 is no longer able to receive the packets transmitted over the communication path 20-2, but can receive the encoded data of the layers L0 and L1. As a result, the video decoding apparatus 30 can reconstruct the picture having the number of gray scale levels corresponding to the combination of the layers L0 and L1.

A computer program to be executed on a computer to implement the functions of the various units constituting the video encoding apparatus or video decoding apparatus may be provided in the form stored in a semiconductor memory or in the form recorded on a recording medium such as an optical recording medium. The term "recording medium" does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to showing of superiority or inferiority of the invention. Although the embodiments of the present invention have been described in detail, it should be understood that the various changes, substitutions, and alterations could be made hereto without departing from the spirit and scope of the invention.

What is claimed is:

1. A video encoding apparatus comprising:
   an encoder configured to encode video data by encoding key data that can be encoded without referring to other data in the video data, first dependent data that is encoded by referring to the key data, and second dependent data that is encoded by referring at least to the first dependent data; and
   a communication processor configured to transmit the encoded key data and the encoded first dependent data to a video decoding apparatus via a first communication path which connects between the video encoding apparatus and the video decoding apparatus, and to transmit the encoded key data and the encoded second dependent data to the video decoding apparatus via a second communication path which is different from the first communication path and connects between the video encoding apparatus and the video decoding apparatus.

2. The video encoding apparatus according to claim 1, wherein the key data includes an intra-predictive encoded picture contained in the video data, the first dependent data includes at least one picture inter-predictive encoded from one direction, one of the at least one picture inter-predictive encoded from one direction refers to the intra-predictive encoded picture, the second dependent data includes at least one picture inter-predictive encoded from two directions, and one of the at least one picture inter-predictive encoded from two directions refers to one of the at least one picture included in the first dependent data and inter-predictive encoded from one direction.

3. The video encoding apparatus according to claim 1, wherein the encoder divides each picture contained in the video data into first layer data that is encoded without referring to other layer data, second layer data that is encoded by referring to the first layer data, and third layer data that is encoded by referring to both the first layer data and the second layer data, the first, second, and third layer data differing in resolution or in the number of gray scale levels, and wherein the first layer data is designated as the key data, the second layer data as the first dependent data, and the third layer data as the second dependent data.

4. A video transmission system comprising a video encoding apparatus and a video decoding apparatus connected to the video encoding apparatus via a first communication path which connects between the video encoding apparatus and the video decoding apparatus and a second communication path which is different from the first communication path and connects between the video encoding apparatus and the video decoding apparatus, wherein
   the video encoding apparatus includes:
   an encoder configured to encodes video data by encoding key data that can be encoded without referring to other data in the video data, first dependent data that is encoded by referring to the key data, and second dependent data that is encoded by referring at least to the first dependent data; and
   a communication processor configured to transmit the encoded key data and the encoded first dependent data to the video decoding apparatus via the first communication path, and to transmit the encoded key data and the encoded second dependent data to the video decoding apparatus via the second communication path which is different from the first communication path, and
   the video decoding apparatus includes:
   a receiver configured to receive the encoded key data and the encoded first dependent data from the first communication path, and to receive the encoded key data and the encoded second dependent data from the second communication path; and
   a decoder configured to decode the encoded key data, the encoded first dependent data, and the encoded second dependent data.

5. The video transmission system according to claim 4, wherein when the receiver has received the key data and the first dependent data from the first communication path but failed to receive the key data and the second dependent data from the second communication path, the decoder decodes the key data and the first dependent data, while, when the receiver has received the key data and the second dependent data from the second communication path but failed to receive the key data and the first dependent data from the first communication path, the decoder decodes only the key data.

6. The video transmission system according to claim 4, wherein the key data includes an intra-predictive encoded picture contained in the video data, the first dependent data includes at least one picture inter-predictive encoded from one direction, one of the at least one picture inter-predictive encoded from one direction refers to the intra-predictive encoded picture, the second dependent data includes at least one picture inter-predictive encoded from two directions, and one of the at least one picture inter-predictive encoded from two directions refers to one of the at least one picture included in the first dependent data and inter-predictive encoded from one direction.

7. The video transmission system according to claim 4, wherein the encoder divides each picture contained in the video data into first layer data that is encoded without referring to other layer data, second layer data that is encoded by referring to the first layer data, and third layer data that is encoded by referring to both the first layer data and the second layer data, the first, second, and third layer data differing in resolution or in the number of gray scale levels, and wherein the first layer data is designated as the key data, the second layer data as the first dependent data, and the third layer data as the second dependent data.

8. A video decoding apparatus comprising:
   a receiver configured to receive, from a first communication path which connects between a video encoding apparatus and the video decoding apparatus, key data encoded without referring to other data contained in video data, and first dependent data contained in the video data and encoded by referring to the key data, and to receive, from a second communication path which is different from the first communication path and connects between the video encoding apparatus and the video decoding apparatus, the encoded key data and second dependent data contained in the video data and encoded by referring at least to the first dependent data; and a decoder configured to decode the key data and the first dependent data when the receiver has received the key data and the first dependent data from the first communication path but failed to receive the key data and the second dependent data from the second communication path, and to decode only the key data when the receiver has received the key data and the second dependent data from the second communication path but failed to receive the key data and the first dependent data from the first communication path.

\* \* \* \* \*